(12) United States Patent
Posch et al.

(10) Patent No.: US 6,516,137 B1
(45) Date of Patent: Feb. 4, 2003

(54) RECORDING ARRANGEMENT FOR DIGITALLY RECORDING A RECEIVED ANALOG VIDEO SIGNAL IN DATA PACKETS OF AN MPEG TRANSPORT STREAM

(75) Inventors: Andreas Posch, Baden (AT); Adolf Proidl, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/399,607

(22) Filed: Sep. 20, 1999

(30) Foreign Application Priority Data

Sep. 22, 1998 (EP) .............................................. 98890268

(51) Int. Cl.⁷ .............................................. H04N 5/926
(52) U.S. Cl. ...................... 386/124; 386/109; 386/112; 386/131
(58) Field of Search .......................... 386/46, 131, 124, 386/98, 109, 111, 112, 68; H04N 5/926

(56) References Cited

U.S. PATENT DOCUMENTS

| | | | | |
|---|---|---|---|---|
| 5,832,085 A | * | 11/1998 | Inoue et al. | 386/131 |
| 6,078,721 A | * | 6/2000 | Uchimi et al. | 386/68 |
| 6,169,843 B1 | * | 1/2001 | Lenihan et al. | 386/46 |
| 6,195,499 B1 | * | 2/2001 | Amada et al. | 386/68 |
| 6,330,695 B1 | * | 12/2001 | Arai | 714/712 |

FOREIGN PATENT DOCUMENTS

EP   0671855 A2   3/1995   ............ H04N/9/83

* cited by examiner

Primary Examiner—Vincent Boccio
(74) Attorney, Agent, or Firm—Edward W. Goodman

(57) ABSTRACT

A recording arrangement (2) includes a first receiving device (25) for receiving an analog video signal (AVS1) and a second receiving device (10) for receiving a digital video signal formed by an MPEG transport stream (TS1), at least one video packet of a received MPEG transport stream (TS1) containing video data encoded in accordance with an MPEG video encoding method (MPEG2 standard (video): ISO/IEC DIS 13.818-2), and further includes a video processor (11) for processing a received video signal (AVS1, TS1) and for supplying an MPEG transport stream (TS3), and also includes a recording device (16) for recording a digital recording data stream (ADS) containing an MPEG transport stream (TS3) supplied by the video processor (11), the video processor (11) further including a video encoder (30) adapted to encode a. digitized video signal (DVS), supplied by the first receiving device (25), in accordance with a further so-called wavelete video encoding method (Research Positions on wavelete image processing; Dec. 9, 1996) and to supply encoded video data, and the video processor (11) including an inserter (31) adapted to insert the encoded video data (VES1) supplied by the video encoder (30) into at least one data packet of an MPEG transport stream (TS2).

8 Claims, 2 Drawing Sheets

RECORDING ARRANGEMENT FOR DIGITALLY RECORDING A RECEIVED ANALOG VIDEO SIGNAL IN DATA PACKETS OF AN MPEG TRANSPORT STREAM

BACKGROUND OF THE INVENTION

1. Field of the Invention

The invention relates to a recording arrangement including first receiving means for receiving an analog video signal, and including second receiving means for receiving a digital video signal formed by an MPEG transport stream, at least one video packet of a received MPEG transport stream containing video data encoded in accordance with an MPEG video encoding method (MPEG2 standard (video): ISO/IEC DIS 13.818-2), and including video processing means for processing a received video signal and for supplying an MPEG transport stream, and including recording means for recording a digital recording data stream containing an MPEG transport stream supplied by the video processing means.

2. Description of the Related Art

Such a recording arrangement of the type defined in the opening paragraph is known from European Patent Application EP 0671855 A2, corresponding to U.S. Pat. No. 5,548,410, and takes the form of a video recorder. The known video recorder has first receiving means for receiving a PAL or NTSC television signal which includes an analog video signal. Second receiving means receives a digital video signal. Digital video signals can be received as digital video data encoded in accordance with an MPEG video encoding method (MPEG2 Standard (Video): ISO/IEC DIGITAL INFORMATION SIGNAL 13.818-2) in video packets of an MPEG transport stream (MPEG2 Standard (System): ISO/IEC 13.818-1). An MPEG transport stream may comprise encoded digital audio data, associated with encoded video data, in audio packets and additional data in data packets of the MPEG transport stream.

The known video recorder further comprises video processing means for processing a received analog video signal and for supplying analog recording signals to recording means. The recording means records a recording signal supplied in accordance with a VHS or SVHS standard on a magnetic tape of a video cassette.

The video processing means of the known video recorder is further adapted to process a received digital video signal formed by an MPEG transport stream, and to supply a recording data stream containing the received MPEG transport stream to recording means. The recording means is adapted to record a digital recording data stream, supplied in accordance with the digital recording standard, on a magnetic tape of a video cassette.

Thus, the known video recorder records a received analog video signal as an analog recording signal in accordance with an analog recording standard, and records a digital video signal received by the known video recorder as a digital recording data stream in accordance with a digital recording standard.

The known video recorder is found to have the disadvantage that received video signals—depending on whether they are received as an analog or a digital video signal—are recorded on a magnetic tape of a video cassette in accordance with different recording standards. As a result of this, the recording means of the known video recorder should support different recording standards. A reproducing arrangement for reproducing an analog recording signal or a digital recording data stream recorded on a magnetic tape by means of the known video recorder, should include detection means for the detection of the recording standard of a recorded analog recording signal or digital recording data stream. Furthermore, such a reproducing arrangement should include reproducing means for reproducing the analog recording signal or the digital recording data stream in accordance with different recording standards.

The known video recorder is also found to have the disadvantage that analog video signals received by the first receiving means can only be recorded in an analog fashion and, consequently, the known advantages of a digital recording are not obtained. Such known advantages are, for example, that there is substantially no loss of quality of a video signal during a recording and reproducing process or that even in the case of a recording data stream which is reproduced very frequently from a magnetic tape, hardly any loss of quality can be found.

SUMMARY OF THE INVENTION

It is an object of the invention to preclude the aforementioned problems and to provide an improved recording arrangement of the type defined in the opening paragraph. In a recording arrangement of the type defined in the opening paragraph this object is achieved in that the video processing means includes video encoding means adapted to encode a digitized video signal, supplied by the first receiving means, in accordance with a further video encoding method (Research Positions on wavelete image processing; Dec. 9, 1996), and to supply encoded video data, and in that the video processing means include insertion means adapted to insert the encoded video data supplied by the video encoding means into at least one data packet of an MPEG transport stream.

This yields the advantage that analog video signals received by the receiving means, as well as received digital video signals contained in an MPEG transport stream, can be recorded as a digital recording data stream in accordance with a recording standard. Consequently, a recording arrangement in accordance with the invention can be particularly simple because it has to support only one recording standard, as a result of which, a particularly cheap recording arrangement is obtained.

The MPEG standard only permits video data encoded in accordance with the MPEG video encoding method to be inserted into video packets of an MPEG transport stream, as a result of which, the requirements imposed by the MPEG standard are met by the insertion of video data encoded by an encoding method other than the MPEG video encoding method into data packets of an MPEG transport stream to be recorded. The compliance with the MPEG standard yields the advantage that video data and audio data of a recording data stream recorded in video packets and audio packets by the recording arrangement can be reproduced by any reproducing arrangement adapted to reproduce a recording data stream recorded in accordance with the respective recording standard and adapted to process an MPEG transport stream.

Moreover, as a result of the advantageous recording of all the received video signals in an MPEG transport stream, a reproducing arrangement can be very simple. Furthermore, it is also possible to record video signals received by the first receiving means as analog video signals, so that the advantages of a digital recording are also obtained for received analog video signals.

It is to be noted that a recording arrangement may include an MPEG video encoder for encoding a digitized video signal supplied by the first receiving means in accordance with the MPEG video encoding method. The MPEG video encoding method is a so-called interframe video encoding method, according to which, a group of consecutive television pictures of an analog video signal are encoded together in a so-called "group of pictures". The whole content of a television picture of a group of television pictures is then encoded only once and, for further television pictures of the group, only the changes of these television pictures are encoded, as a result of which, only a small amount of encoded video data must be recorded. However, for processing a group of television pictures, an MPEG video encoder requires memory means with a very high storage capacity, as a result of which, it is practicable only to provide an MPEG video encoder in, for example, a transmitting station and not in a recording arrangement of a video recorder.

In a recording arrangement as described above, it has proven to be advantageous in that the video encoding means for encoding a digitized video signal in accordance with an intraframe video encoding method is adapted to separately encode each television picture of the digitized video signal. This has the advantage that such video encoding means requires memory means having a storage capacity for the storage of only one television picture of a received digitized video signal. This advantageously results in simple video encoding means and, consequently, in a low-cost recording arrangement which can also be used in a video recorder.

In a recording arrangement as described above, it has proven to be advantageous that the recording arrangement further comprises error correction insertion means for generating and inserting interleaved error correction information in accordance with a DVHS standard, and the recording means records a recording data stream in helical recording tracks on a magnetic tape in accordance with the DVHS standard. In accordance with a DVHS standard (Victor Company of Japan, no. 07015 of Jul. 25, 1997), interleaved error correction information generated by error correction insertion means is inserted into DVHS header information of the recording data stream. Here, the interleaving of the error correction information involves a scrambling of packets of a processing data domain including packets of a recording data stream to be recorded in six adjacent helical recording tracks, which data stream may include a multitude of video, audio and data packets. This error correction is referred to as an interleaved error correction. This has the advantage that encoded video data recorded in data packets can be reproduced in a particularly reliable manner by a reproducing arrangement, and that hardly any loss of quality of a received analog video signal occurs in a recording and reproducing arrangement.

In a recording arrangement as described above, it has proven to be advantageous that the first receiving means receives an analog video signal in accordance with the PAL standard, and the insertion means alternately inserts encoded video data of two and of three television pictures of the received video signal into data packets of a recording data stream, said recording data stream being recordable in six helical recording tracks. This has the advantage that PAL-standard television pictures of a received analog video signal can be recorded in a recording data stream on a magnetic tape in such a manner that after the recording data stream has been recorded on a magnetic tape, it is possible to edit encoded video data of television pictures recorded in data packets of the recording data stream.

In a recording arrangement as described above, it has proven to be advantageous that the first receiving means receives an analog video signal in accordance with the NTSC standard, and the insertion means inserts encoded video data of each time three television pictures of the received video signals into data packets of a recording data stream, said recording data stream being recordable in six helical recording tracks. This has the advantage that NTSC-standard television pictures of a received analog video signal can be recorded in a recording data stream on a magnetic tape in such a manner that after the recording data stream has been recorded on a magnetic tape, it is possible to edit television pictures recorded in data packets of the recording data stream.

In a recording arrangement as described above, it has proven to be advantageous that the video encoding means encodes a digitized video signal received by the first receiving means in accordance with a further wavelete video encoding method. This has the advantage that the video encoding means encodes a received digitized video signal in accordance with a known wavelete video encoding method (Research Positions on wavelete image processing; Dec. 9, 1996) and may be formed by a commercially available integrated circuit, so that low-cost video encoding means are obtained.

In a recording arrangement as described above, it has proven to be advantageous that the recording arrangement further comprises control means for insert identification information into a sub-code area of a helical recording track as defined in the DVHS standard when at least one data packet of the recording data stream contains video data encoded in accordance with the further video encoding method. This has the advantage that helical recording tracks containing data packets with encoded video data can be identified and, consequently, it is also possible to record other additional information in data packets.

In a recording arrangement as described above, it has proven to be advantageous that the recording arrangement further comprises a reproducing arrangement for reproducing a recording data stream having been recorded on a magnetic tape as a reproducing data stream, and the control means reads at least one item of identification information contained in the reproducing data stream and having been recorded in a sub-code area of a helical recording track, and the control means supplies control information when identification information is present, and the recording arrangement further comprises video decoding means for decoding video data encoded in accordance with the further video encoding method, and in that the recording arrangement further comprises a demultiplexer for supplying video data contained in the reproducing data stream and encoded in accordance with the further video encoding method to the video decoding means when control information from the control means is available. This has the advantage that received analog video signals, which have been encoded in accordance with a further video encoding method in a recording mode for recording in data packets of an MPEG transport stream, can be decoded in a reproducing mode by means of video decoding means in accordance with a video decoding method corresponding to the further video encoding method.

BRIEF DESCRIPTION OF THE DRAWINGS

The invention will be described in more detail hereinafter with reference to an embodiment shown in the drawings and given by way of example, to which the invention is not limited, in which.

DESCRIPTION OF THE PREFERRED EMBODIMENTS

Figure 1:
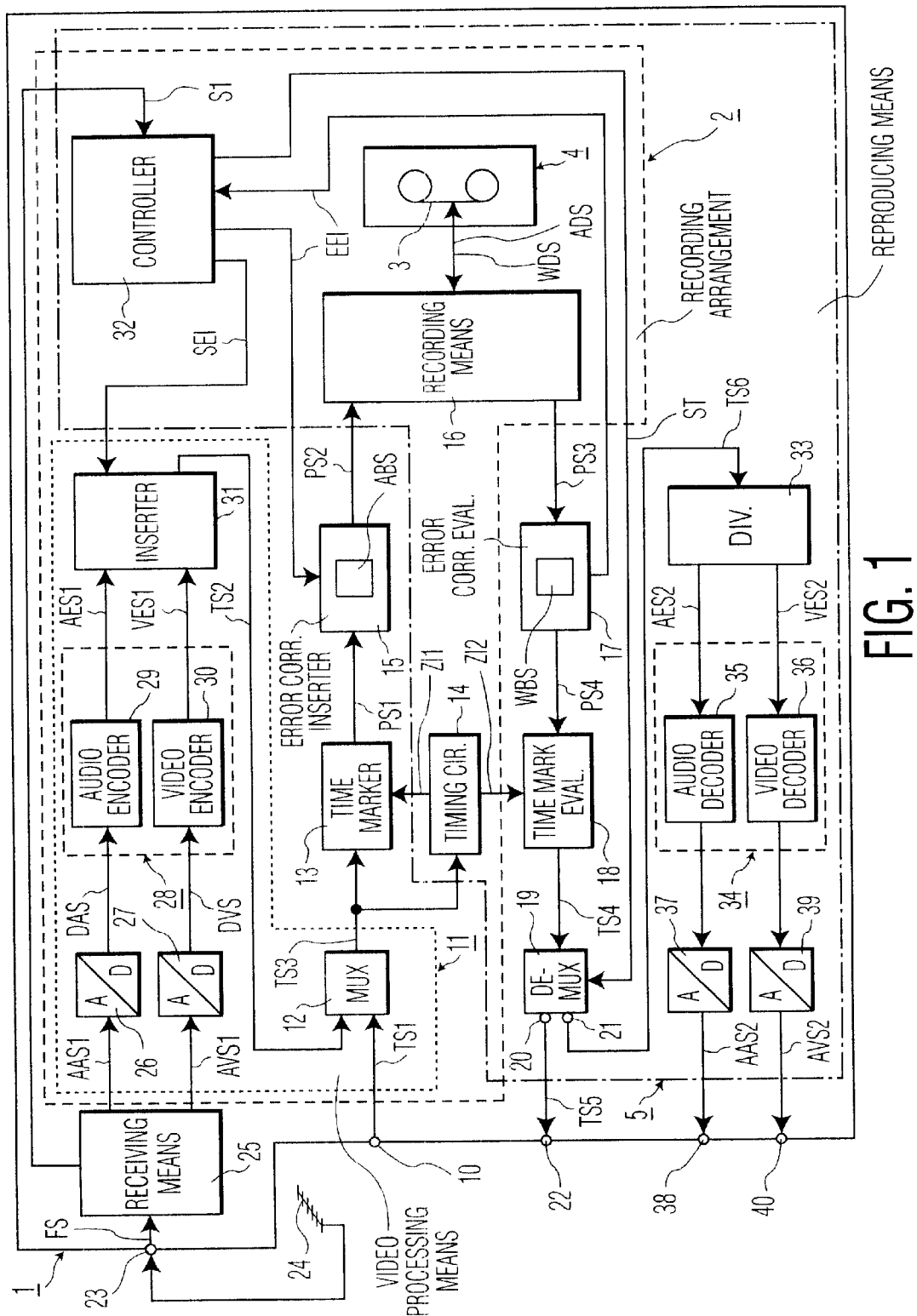
FIG. 1 is a block diagram which diagrammatically shows a video recorder adapted to receive an analog video signal and including a recording arrangement adapted to record a received video signal as video data in data packets of an MPEG transport stream embedded in a recording data stream.

FIG. 1 shows a video recorder 1 having a recording arrangement 2 for recording, in a recording mode of the video recorder 1, a recording data stream ADS, in accordance with a DVHS standard (Victor Company of Japan, no. 07015 of July 25, 1997), on a magnetic tape 3 of a video cassette 4. The video recorder 1 further has a reproducing arrangement 5 for reproducing, in a reproducing mode of the video recorder 1, a recording data stream ADS, which complies with the DVHS standard and has been recorded on the magnetic tape 3, as a reproduction data stream.

Figure 2:
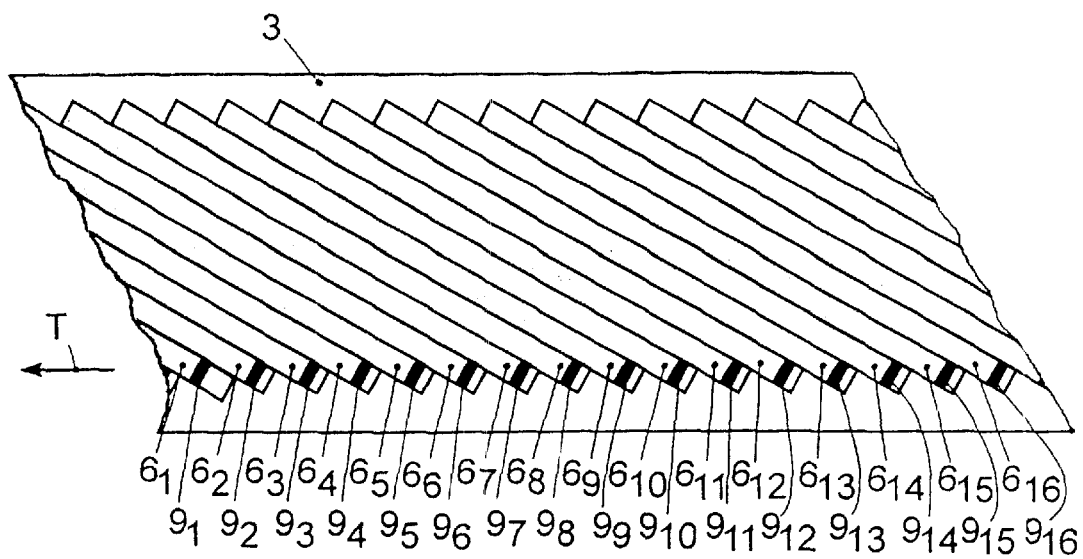
FIG. 2 shows a part of a magnetic tape on which a recording data stream in accordance with a DVHS standard has been recorded in helical recording tracks by the video recorder shown in FIG. 1.

FIG. 2 shows a part of the magnetic tape 3 of the video cassette 4, this tape being movable in a transport direction T, in a manner not shown in FIG. 1, in the recording mode and in the reproducing mode. In the recording mode, a recording data stream ADS can be recorded alternately by a first magnetic head (not shown), having an azimuth angle of +30°, in helical recording tracks 61, 63, 65 . . . 615, and by a second magnetic head (not shown), having an azimuth angle of −30°, in helical recording tracks 62, 64, 66 . . . 616, as defined in the DVHS standard.

Figure 3:
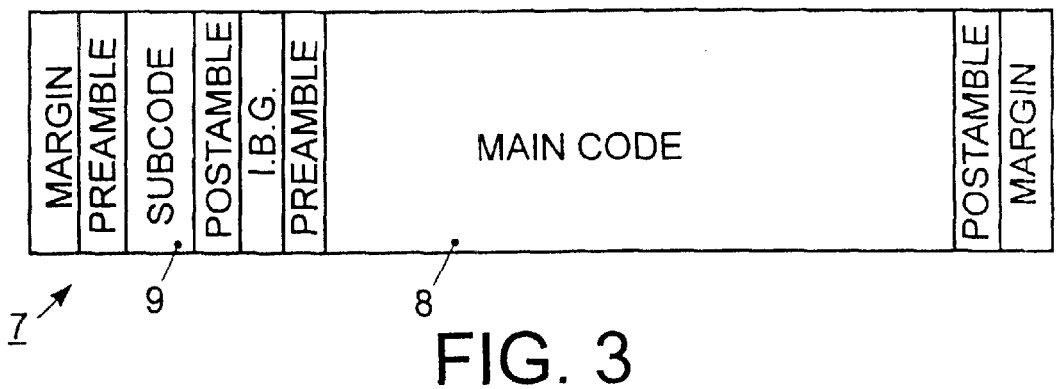
FIG. 3 shows a data structure defined in the DVHS standard, in accordance with which, a recording data stream can be recorded in a helical recording track of the magnetic tape by the video recorder shown in FIG. 1.

FIG. 3 shows a data structure 7, in accordance with the DVHS standard, for recording a recording data stream ADS in each helical recording track 6 of the magnetic tape 3. In the data structure 7, data, referred to as a "payload", contains the information to be recorded essentially in 336 synchronization blocks of a main code area 8. Moreover, addition information, relating to the data recorded in the main code area 8, can be recorded in so-called sub-code areas 9 of each helical recording track 6.

In accordance with the DVHS standard, data can be recorded at a data rate of 19.13856 Mb/second, which can be calculated as follows:

data rate=60 (recorded helical recording tracks/seconds)*356 (synchronization blocks/main code area 8 of a helical recording track 6)*112(bytes/synchronization block)*8(bits/byte)= 19.13856 Mb/second.

An MPEG transport stream TS in accordance with an MPEG standard (MPEG2 standard (system): ISO/IEC 13.818-1), is adapted to transmit information in packets. Each packet has 188 bytes including a header area and an information area. In a header area, the type of packet is specified and, in an information area, the so-called payload data can be inserted. The MPEG standard defines packets of three types, i.e., video packets, audio packets and data packets. A video packet can convey video data encoded in accordance with an MPEG video encoding method (MPEG2 standard (video): ISO/IEC DIS 13.818-2), and an audio packet can convey audio data encoded in accordance with an MPEG audio encoding method (MPEG2 standard (audio): ISO/IEC 13.818-3). Furthermore, the MPEG standard defines data packets for carrying so-called private data. The MPEG standard does not prescribe the nature of the data forming the so-called private data.

An MPEG transport stream TS can convey video data encoded in video packets and audio data encoded in audio packets for one film, or for a plurality of films. Data packets of the MPEG transport stream TS can convey additional information relating to a film transmitted in video packets and audio packets, which additional information can be formed, for example, by a summary of the content of a film.

The DVHS standard prescribes that a packet of an MPEG transport stream TS should be recordable in two adjacent synchronization blocks of the main code area 8 of a helical recording track 6. The recording arrangement 2 of the video recorder 1 is adapted to record a recording data stream ADS containing an MPEG transport stream TS in accordance with the DVHS standard.

The video recorder 1 further has a transport stream input 10 via which a first MPEG transport stream TS1 can be applied to the video recorder 1. The transport stream input 10 thus forms second receiving means for receiving a digital video signal formed by the first MPEG transport stream TS1, video data encoded in accordance with the MPEG video encoding method being receivable in at least one video packet of the first MPEG transport stream TS1. A first MPEG transport stream TS1 can be supplied to the transport stream input 10 by, for example, a set-top box not shown in FIG. 1.

A first MPEG transport stream TS1 applied to the transport stream input 10 is transferred to video processing means 11 for processing a received video signal and for supplying an MPEG transport stream. The video processing means 11 includes a multiplexer 12 connected to the transport stream input 10 for receiving the first MPEG transport stream S1. The multiplexer 12 also receives a second MPEG transport stream TS2, which will be described in detail hereinafter.

The multiplexer 12 effects a time-shifted insertion of packets contained in the first MPEG transport stream TS1 and the second MPEG transport stream TS2, into a third MPEG transport stream TS3 supplied by the multiplexer 12.

The third MPEG transport stream TS3 is applied to time marking meats 13 and timing means 14. The timing means 14 determines time synchronization information included in an MPEG transport stream TS and also known as "program clock reference" (PRC). The timing means 14 sets a first clock in the timing means 14 using the detected time synchronization information. Time information ZI1, supplied by the first clock in the first timing means 14, is applied to the time marking means 13.

The time marking means 13 assigns the time information ZI1, supplied to the time marking means 13 by the timing means 14, to each packet of the third MPEG transport stream TS3 at the instant of reception of the respective packet. The time marking means 13 supplies a first packet stream PS1 to error correction insertion means 15, in which time information ZI1 has been assigned to each packet of the first MPEG transport stream TS3.

The error correction insertion means 15 generates and inserts interleaved error correction information in accordance with the DVHS standard. For this purpose, the error correction insertion means 15 includes recording processing means ABS for storing a plurality of packets together with associated time information ZI1 of the first packet stream PS1 in a processing data area. For each row and each column of a stored processing data area, the error correction insertion means 15 determines error correction information and stores this information in the processing data area of the recording processing memory means ABS. Subsequently, certain parts of this processing data area are stored in the recording processing memory means ABS in an interleaved fashion, which results in an error correction information referred to as "interleaved error correction" and laid down in the DVHS standard. Such a processing data area, which accommodates packets together with time information ZI and error correction information, can be recorded in six adjacent helical recording tracks in accordance with the DVHS standard and can, for this purpose, be applied to recording means 16 of the recording arrangement 2 as a second packet stream PS2.

In a manner not shown in FIG. 1, the recording means 16 moves the magnetic tape 3 in the transport direction T and rotates the first and the second magnetic head such that the magnetic heads scan the helical recording tracks 6 of the magnetic tape 3 in the recording mode and in the reproducing mode. The second packet stream PS2 applied to the recording means 16 is recorded on the magnetic tape 3 as a recording data stream ADS in accordance with the DVHS standard.

In the reproducing mode of the video recorder 1, the recording means 16 also forms reproducing means for reproducing a recording data stream ADS, recorded on the magnetic tape 3, as a reproducing data stream WDS. A reproducing data stream WDS, reproduced by the recording means 16 in the reproducing mode, is supplied to error correction evaluation means 17 as a third packet stream PS3.

The error correction evaluation means 17 includes a reproducing processing memory for storing the data of the third packet stream packet stream reproduced from six adjacent helical recording tracks 6 of the magnetic tape 3. The error correction evaluation means 17 evaluates error correction information inserted by error correction insertion means 15 in the recording mode. The error correction evaluation means 17 corrects errors that may occur during the recording and reproducing process. The error correction evaluation means 17 supplies a fourth packet stream PS4 to time marking evaluation means 18, the fourth packet stream PS4 containing packets together with the associated time information ZI1 and basically corresponding to the first packet stream PS1.

In the reproducing mode of the video recorder 1, the timing means 14 supplies time information ZI2 from a quartz-controlled second clock of the timing means 14 to the time marking evaluation means 18. When time information ZI1 associated with a packet in the fourth packet stream PS4, corresponds to time information ZI2 applied to the time marking evaluation means 18 by the timing means 14, the time marking evaluation means 18 supplies the corresponding packet and thus, supplies a fourth MPEG transport stream TS4 to a demultiplexer 19. The provision of the time marking means 13 and the time marking evaluation means 18 ensures that packets of the reproduced fourth MPEG transport stream TS4 are spaced from each other at time intervals equal to those with which these packets have been recorded in the third MPEG transport stream TS3.

Furthermore, control information ST is applied to the demultiplexer 19, which will be described in detail hereinafter. In the reproducing mode, in the absence of control information ST, the demultiplexer 19 supplies the fourth MPEG transport stream TS4 to a first demultiplexer output 20 and, when control information ST is available, supplies the fourth MPEG transport stream TS4 to a second demultiplexer output 21.

The first demultiplexer output 20 of the demultiplexer 19 is connected to a transport stream output 22 of the video recorder 1. In the absence of control information ST, the fourth MPEG transport stream TS4 is applied from the demultiplexer 19 to the transport stream output 22 of the video recorder 1 as a fifth MPEG transport stream TS5.

In the recording mode, the video recorder 1 records, on the magnetic tape 3, a first MPEG transport stream TS1 applied to its transport stream input 10 in a recording data stream ADS. In the reproducing mode, the video recorder 1 reproduces a recording data stream ADS recorded on the magnetic tape 3 as a reproducing data stream WDS, and supplies a fifth MPEG transport stream TS5 included in the reproducing data stream WDS to its transport stream output 22.

The video recorder 1 has an antenna input 23 connected to an antenna 24 for receiving a television signal FS in accordance with the PAL standard or the NTSC standard. The video recorder 1 further has first receiving means 25 connected to the antenna input 23 and formed by a tuner. In a manner not shown in FIG. 1, the first receiving means 25 can be set to receive a given television signal FS by a user of the video recorder 1.

The first receiving means 25 supplies a first analog audio signal AAS1 contained in a received television signal FS to first A/D converter means 26, and supplies a first analog video signal AVS1 contained in a received television signal FS to second A./D converter means 27. The first receiving means 25 further supplies standard information SI, which contains information indicating whether a received television signal FS complies with the PAL standard or the NTSC standard, as will be described in further detail hereinafter.

The video processing means 11 includes encoding means 28 comprising audio encoding means 29 and video encoding means 30. The audio encoding means 29 encodes a digitized audio signal DAS supplied by the first A/D converter means 26 in accordance with the MPEG audio encoding method, and supplies encoded audio data in a first audio elementary stream AES1.

The video encoding means 30 encodes a video signal DVS, supplied by the first receiving means 25 and digitized by the second A/D converter means 27, in accordance with a further, so-called wavelete, video encoding method (Research Positions on Wavelete Image Processing; Dec. 9, 1996). In accordance with this further video encoding method, the video encoding means 30 separately encodes each television picture contained in a digitized video signal DVS received by the first receiving means 25. The digitized video signal DVS of a television picture is then stored in memory means of the video encoding means 30 as video data in order to be processed, and the further video encoding method is applied to the video data stored in the memory means. The video encoding means 30 supplies encoded video data of each television picture in a first video elementary stream VES1. Such video encoding methods, such as, for example, the wavelete video encoding method (Research Positions on Wavelete Image Processing; Dec. 9, 1996), are known as intraframe video encoding methods.

This gives the advantage that the video encoding means 30 requires memory means whose storage capacity is adequate to store video data of only one television picture of a received digitized video signal DVS. As a result of this, the video encoding means 30 can be manufactured at very low cost and may take the form of, for example, an integrated circuit available from Analog Devices under the type designation ADV601.

The video processing means 11 includes insertion means 31 for inserting the encoded audio data, supplied by the audio encoding means 29 in the first audio elementary stream AES1, into audio packets of the second MPEG transport stream TS2. However, the insertion means 31 also inserts encoded video data, supplied by the video encoding means 30 in the first video elementary stream VES1, into at least one data packet of the second MPEG transport stream TS2.

Thus, encoded video data of the received first analog video signal AVS1 are inserted into data packets and not into video packets of the second MPEG transport stream TS2. Since the MPEG standard allows arbitrary data to be inserted into data packets, the second MPEG transport stream TS2 complies with the MPEG standard. This yields the advantage that video data, recorded in video packets and audio packets of a recording data stream ADS recorded by the video recorder 1, can be reproduced by any reproducing arrangement adapted to reproduce a recording data stream ADS recorded in accordance with the DVHS standard and to process an MPEG transport stream.

The second MPEG transport stream TS2 generated by the insertion means 31 is applied to the multiplexer 12. The multiplexer 12 supplies either the first MPEG transport stream TS1 or the second MPEG transport stream TS2 to the time marking means 13 as a third MPEG transport stream TS3. When both a first MPEG transport stream TS1 and a second MPEG transport stream TS2 are applied to the multiplexer 12 in the recording mode of the video recorder 1, the user can select one of the two MPEG transport streams, in a manner not illustrated in FIG. 1, for recording on the magnetic tape 3.

It is to be noted that the multiplexer 12 can also be adapted to insert both the first MPEG transport stream TS1 and the second MPEG transport stream TS2 into the third MPEG transport stream TS3. However, in that case, care must be taken that the third MPEG transport stream TS3 has a data rate which is not too high, so as to allow the third MPEG transport stream TS3 to be recorded in a recording data stream ADS in accordance with the DVHS standard.

The video recorder 1 further comprises control means 32 for receiving standard information SI from the first receiving means 25, this standard information containing information indicating whether a received television signal FS complies with the PAL standard or the NTSC standard. Depending on the applied standard information SI, the control means 32 supplies standard insertion information SEI to the insertion means 31. Depending on the presence or absence of standard insertion information SEI, the insertion means 31 inserts encoded video data contained in the first video elementary stream VES1 in a different manner into data packets of the second MPEG transport stream TS2, as will be described in detail hereinafter.

As explained hereinbefore, it is possible to record data at a data rate of 19.13856 Mbit/second in accordance with the DVHS standard. This data rate is adequate to record, in the recording mode, video data of 30 television pictures per second, encoded in accordance with the further video encoding method, together with time information ZI1 allocated by the time marking means 13 and with error correction information inserted by the error correction insertion means 15 onto the magnetic tape 3 in accordance with the DVHS standard. A television signal FS in accordance with the PAL standard comprises 25 television pictures per second and a television signal in accordance with the NTSC standard comprises essentially 30 television pictures per second.

As stated hereinbefore, packets stored in the processing data area of the recording processing memory means ABS, together with time information ZI and error correction information, can be recorded in six helical recording tracks 6 on the magnetic tape 3. Furthermore, as stated hereinbefore, the DVHS standard allows a recording data stream ADS to be recorded in 60 helical recording tracks 6 every second, so that it is possible to record data stored in ten processing data areas of the recording processing memory means ABS. It follows that encoded video data of three television pictures encoded in accordance with the further encoding method can be stored in a processing data area of the recording processing memory means ABS.

When there is standard insertion information SEI which characterizes the reception of a television signal FS in accordance with the PAL standard by the first receiving means 25, the insertion means 31 of the video recorder 1 alternately inserts encoded video data of two or three television pictures of the received first analog video signal AVS1 into data packets of, each time, one processing data area.

In a first example, encoded video data of a first and a second television picture of a first analog video signal AVS1, contained in a received television signal FS in accordance with the PAL standard, are inserted into data packets of a first processing data area in the recording mode, these data packets being recorded in the helical recording track $6_1$ to $6_6$. Furthermore, encoded video data of a third, a fourth and a fifth television picture of the received television signal FS in accordance with the PAL standard, are inserted into the data packets of a second processing data area, these data packets being recorded in the helical recording tracks $6_7$ to $6_{12}$. Subsequently, during one second, encoded video data of alternately two and three television pictures are inserted into a third, fourth to tenth further processing data area and recorded as a recording data stream ADS, as explained hereinbefore.

In the first example, encoded video data of, in total, 25 television pictures per second, inserted into data packets of the processing data areas and stored in the processing data areas, are recorded on the magnetic tape 3 ten times in succession every second. This corresponds to the number of television pictures per second as defined in the PAL standard.

This yields the advantage that the video recorder 1 can record a received television signal FS in accordance with the PAL standard on the magnetic tape 3 in data packets of a second MPEG transport stream TS2 in accordance with the MPEG standard in a recording data stream ADS in accordance with the DVHS standard. Due to the fixed allocation of encoded video data of television pictures to given processing data areas, the advantage is obtained that the PAL standard television pictures of a received first analog video signal AVS1 are recorded in the recording data stream ADS on a magnetic tape 3 in such a manner that it is possible to edit recorded encoded video data of television pictures of a processing data area after recording of the recording data stream ADS.

In the absence of standard insertion information SEI, which characterizes the reception of a television signal FS in accordance with the NTSC standard by the first receiving means 25, the insertion means 31 of the video recorder 1 inserts encoded video data of, each time, three television pictures of the received first analog video signal AVS1 into data packets of a processing data area.

In a second example, encoded video data of, each time, three television pictures of the received television signal FS in accordance with the PAL standard, are inserted into and stored in data packets of a first and second to tenth processing data areas.

In the second example, encoded video data of, essentially, a total of 30 television pictures per second stored in the processing data areas, are recorded on the magnetic tape 3 ten times in succession every second as a recording data stream ADS, as explained hereinbefore. This corresponds to the number of television pictures per second as defined in the NTSC standard.

This yields the advantage that the video recorder 1 can record a received television signal FS in accordance with the NTSC standard on the magnetic tape 3 in data packets of a second MPEG transport stream TS2 in accordance with the MPEG standard in a recording data stream ADS in accordance with the DVHS standard. Due to the fixed allocation of encoded video data of television pictures to given processing data areas, the advantage is obtained that the NTSC standard television pictures of a received first analog video signal AVS1 are recorded in the recording data stream ADS on a magnetic tape 3 in such a manner that it is possible to edit recorded encoded video data of television pictures of a processing data area after recording of the recording data stream ADS.

In the above explanation relating to the packets which can be recorded on the magnetic tape 3 as data having a data rate of 19.13856 Mbits/second in accordance with the DVHS standard, no reference has been made to encoded audio data inserted into audio packets of the second MPEG transport stream TS2 by the insertion means 31, because these require only a small portion of the recordable data rate. However, it is to be noted that in the case of recording of the aforementioned number of television pictures per second, it is also possible to record associated encoded audio data in audio packets in the recording data stream ADS in accordance with the DVHS standard.

When at least one data packet of the recording data stream ADS contains video data encoded in accordance with the further video encoding method, the control means 32 of the video recorder 1 inserts home-recording insertion information EEI as identification information in a sub-code area 9 of a helical recording track 6, this sub-code area being defined in the DVHS standard.

When a received analog television signal FS is to be recorded in data packets of the second MPEG transport stream TS2 in the recording mode of the video recorder 1, the control means 32 supplies the home-recording insertion information EEI to the error correction insertion means 15. The error correction insertion means 15 stores the supplied home-recording insertion information EEI in given memory locations of the recording processing memory means ABS, these locations corresponding to sub-code areas 9 of the six helical recording tracks 6 in which the data stored in the recording processing memory means ABS should be recorded on the magnetic tape 3. When the video data encoded in accordance with the further video encoding method are stored in the recording processing memory means ABS in order to be recorded, the error correction insertion means 15 stores the home-recording insertion information EEI in given memory locations of the recording processing memory means ABS.

This yields the advantage that a second MPEG transport stream TS2 recorded on the magnetic tape 3 in a recording data stream ADS is characterized by the home-recording insertion information EEI in sub-code areas 9 when data packets of the second MPEG transport stream TS2 contain video data encoded in accordance with the further video encoding method.

In the recording mode of the video recorder 1, as explained hereinbefore, those data of the third packet stream PS3 which have been reproduced from six successive helical recording tracks 6 are stored in the processing data area of the reproduction processing memory WBS. In the recording mode, the control means 32 reads out given memory locations of the reproduction processing memory WBS, these memory locations storing data of the six sub-code areas 9 of the six helical recording tracks 6.

When, in the reproducing mode, the control means 32 detects home-recording insertion information EEI in one of the six sub-code areas 9 stored in the reproduction processing memory WBS, the control means 32 supplies the control information ST to the demultiplexer 19. As explained hereinbefore, the fourth MPEG transport stream TS4 supplied to the demultiplexer 19 is applied to the second demultiplexer output 21 upon the occurrence of control information ST.

The reproducing means 5 further comprises dividing means 33 connected to the demultiplexer output 21 and to which a fourth MPEG transport stream TS4, supplied to the second demultiplexer output 21, is applied as a sixth MPEG transport stream TS6. A second MPEG transport stream TS2, which contains data packets and audio packets and has been recorded on the magnetic tape 3 in the recording mode, basically corresponds to a sixth MPEG transport stream TS6 supplied to the dividing means 33 in the reproducing mode. The dividing means 33 divides data packets and audio packets contained in the sixth MPEG transport stream TS6, and supplies data packets in a second video elementary stream VES2, and supplies audio packets in a second audio elementary stream AES2.

The reproducing means 5 further comprises decoding means 34 which includes audio decoding means 35 and video decoding means 36. A second audio elementary stream AES2 supplied by the dividing means 33 is applied to the audio decoding means 35 and a second video elementary stream VES2 is applied to the video decoding means 36.

The audio decoding means 35 decodes audio data contained in the second audio elementary stream AES2 and encoded in accordance with the MPEG audio encoding method. Audio data decoded by the audio decoding means 35 is applied to first D/A converter means 37, which supplies a second analog audio signal AAS2 to an audio output 38 of the video recorder 1.

The video decoding means 36 decodes video data contained in the second video elementary stream VES2 and encoded in accordance with the further video encoding method. Video data decoded by the video decoding means 36 is applied to second D/A converter means 39, which supplies a second analog video signal AVS2 to a video output 40 of the video recorder 1.

This yields the advantage that a first analog video signal AVS1 received by the video recorder 1 can be recorded in data packets of the second MPEG transport stream TS2 in the recording mode, and can be reproduced by the video recorder 1 as a second analog.video signal in the reproducing mode. The recording arrangement 2 of the video recorder 1 is thus adapted to record the recording data stream ADS, which is in accordance with the DVHS standard and which includes both the first analog video signal AVS1 supplied to the video recorder 1 and the digital video signal which is contained in the third MPEG transport stream TS3 and which has also been supplied to the video recorder 1 as a first MPEG transport stream TS1. The reproducing arrangement 5 of the video recorder 1 is thus adapted to reproduce a third MPEG transport stream TS3, which has been recorded in accordance with the DVHS standard, as a fourth MPEG transport stream TS4, video data encoded in accordance with the further video encoding method and contained in data packets of the fourth MPEG transport stream TS4 being supplied as a second analog video signal AVS2 when home-recording insertion information EEI is present.

This yields the advantage that the known advantages of a digital recording are also obtained for a received first analog video signal AVS1. Such advantages are, for example, that there is hardly any loss of quality of the first analog video signal AVS1 in comparison with the second analog video signal AVS2 in a recording and reproducing cycle. Moreover, even in the case of a reproducing data stream WDS which is reproduced very frequently from the magnetic tape 3, hardly any loss of quality can be found in the reproduced analog video signal AVS2.

It is to be noted that a recording arrangement may also be adapted to record a recording data stream in accordance with a DVC specification (Basic Specifications for Consumer-Use Digital VCR; August 1993), which contains video data of a received analog video signal in data packets of an MPEG transport stream, the video data being encoded in accordance with a further video encoding method.

It is to be noted that the home-recording insertion information EEI for the identification of a home recording where a received analog video signal has been recorded in data packets of an MPEG transport stream on a magnetic tape, need not be recorded in each sub-code area of each helical recording track in whose main code area such data packets have been recorded.

It is to be noted that a multitude of further video encoding methods in accordance with which video data can be encoded are known to those skilled in the art.

What is claimed is:

1. A recording arrangement comprising:
   first receiving means for receiving an analog video signal;
   second receiving means for receiving a digital video signal formed by an MPEG transport stream, at least one video packet of the received MPEG transport stream containing video data encoded in accordance with an MPEG video encoding method;
   video processing means for processing a received video signal, and for supplying an MPEG transport stream; and
   recording means for recording a digital recording data stream containing an MPEG transport stream supplied by the video processing means, characterized in that the video processing means includes:
   video encoding means for encoding a digitized video signal, supplied by the first receiving means, in accordance with a further video encoding method, and for supplying the encoded digitized video data; and
   insertion means for inserting the encoded digitized video data supplied by the video encoding means into at least one data packet of an MPEG transport stream.

2. The recording arrangement as claimed in claim 1, characterized in that the video encoding means separately encodes each television picture contained in a digitized video signal received by the first receiving means in accordance with an intraframe video encoding method.

3. The recording arrangement as claimed in claim 2, characterized in that the recording arrangement further comprises error correction insertion means for generating and inserting interleaved error correction information in accordance with a DVHS standard, and the recording means records a recording data stream in helical recording tracks on a magnetic tape in accordance with the DVHS standard.

4. The recording arrangement as claimed in claim 3, characterized in that the first receiving means receives an analog vide signal in accordance with the PAL standard, and the insertion means alternately inserts encoded video data of two and of three television pictures of the received video signal into data packets of a recording data stream, said recording data stream being recordable in six helical recording tracks.

5. The recording arrangement as claimed in claim 3, characterized in that the first receiving means receives an analog video signal in accordance with the NTSC standard, and the insertion means inserts encoded video data of, each time, three television pictures of the received video signals into data packets of a recording data stream, said recording data stream being recordable in six helical recording tracks.

6. The recording arrangement as claimed in claim 2, characterized in that the video encoding means encodes a digitized video signal received by the first receiving means in accordance with a further wavelete video encoding method.

7. The recording arrangement as claimed in claim 3, characterized in that said recording arrangement further comprises control means for inserting identification information into a subcode area of a helical recording track as defined in the DVHS standard when at least one data packet of the recording data stream contains video data encoded in accordance with the further video encoding method.

8. The recording arrangement as claimed in claim 7, characterized in that said recording arrangement further comprises a reproducing arrangement for reproducing a recording data stream having been recorded on a magnetic tape as a reproducing data stream, and the control means reads at least one item of identification information contained in the reproducing data stream and having been recorded in a subcode area of a helical recording track, and the control means further supplies control information when identification information is present, and said recording arrangement further comprises video decoding means for decoding video data encoded in accordance with the further video encoding method, and in that said recording arrangement further comprises a demultiplexer for supplying video data contained in the reproducing data stream and encoded in accordance with the further video encoding method to the video decoding means when control information from the control means is available.

* * * * *